United States Patent [19]
Van Ruyven

[11] Patent Number: 5,729,334
[45] Date of Patent: Mar. 17, 1998

[54] FRAUD-PROOF IDENTIFICATION SYSTEM

[76] Inventor: Lodewijk Johan Van Ruyven, POB 338, 5300 AH Zaltbommel, Netherlands

[21] Appl. No.: 801,892

[22] Filed: Feb. 18, 1997

Related U.S. Application Data

[63] Continuation of Ser. No. 295,828, filed as PCT/NL93/00048, Mar. 3, 1993, published as WO93/18486, Sep. 16, 1993, abandoned.

[30] Foreign Application Priority Data

Mar. 10, 1992 [NL] Netherlands ............................ 9200439

[51] Int. Cl.⁶ .................................................. G06K 9/74
[52] U.S. Cl. ............................ 356/71; 382/125; 382/126
[58] Field of Search ................................. 382/124–127; 356/71

[56] References Cited

U.S. PATENT DOCUMENTS

| | | |
|---|---|---|
| 3,558,864 | 1/1971 | French . |
| 3,864,042 | 2/1975 | Leventhal ................................ 356/71 |
| 3,876,842 | 4/1975 | Bouwhuis . |
| 3,909,608 | 9/1975 | Le Merer et al. . |
| 4,003,656 | 1/1977 | Leventhal ................................ 356/398 |
| 4,210,899 | 7/1980 | Swonger et al. ........................ 382/125 |
| 4,428,670 | 1/1984 | Ruell et al. ................................ 356/71 |
| 4,896,363 | 1/1990 | Taylor et al. . |
| 5,054,090 | 10/1991 | Knight et al. ............................ 382/127 |
| 5,239,590 | 8/1993 | Yamamoto ................................ 382/127 |
| 5,241,606 | 8/1993 | Horie ........................................ 356/71 |
| 5,267,324 | 11/1993 | Kumagai .................................. 382/127 |

FOREIGN PATENT DOCUMENTS

| | | |
|---|---|---|
| 3222112 | 3/1984 | Germany . |
| 60-029875 | 2/1985 | Japan . |
| 1-175687 | 7/1989 | Japan . |
| WO89/02722 | 4/1989 | WIPO . |
| WO89/03099 | 4/1989 | WIPO . |

*Primary Examiner*—Frank G. Font
*Assistant Examiner*—Jason D. Vierra Eisenberg
*Attorney, Agent, or Firm*—David P. Gordon

[57] ABSTRACT

A fraud-proof identification system is provided with a point-to-point in focus imaging system preferably a line tracking arrangement for imaging skin profiles particularly of the thumb-top which contains relatively many continuous lines and avoids mental association with criminal finger print actions. Characteristics from skin profiles, preferably mutual line distances progressively measured along a selected skin line are compared with such information stocked in the system in order to discriminate upon authorization. A line tracking system is preferably provided with a servo-mechanism, a control signal of which acting as measuring signal.

16 Claims, 7 Drawing Sheets

FRAUD-PROOF IDENTIFICATION SYSTEM

This is a continuation of U.S. Ser. No. 08/295,828, filed as PCT/NL93/00048, Mar. 3, 1993, published as WO93/18486, Sep. 16, 1993, now abandoned.

BACKGROUND OF THE INVENTION

The invention relates to a fraud-proof identification system comprising imaging means for recording skin line profiles, selection means to extract geometrical characteristics from such recordings and comparison means to compare such characteristics with characteristics stored in a memory. The invention also pertains to means usable in such systems.

Such an identification system is known from EP-A-300 167.

Fraud-proof identification systems, are used to discriminate whether or not a person is authorized to do a certain action. Known systems of this kind are usually based on a code such as a pin-code etcetera which is exclusively known to an authorized person. The need to make use of tools such as a card with a personal code or something equivalent has the disadvantage that an authorized person must have this available at the right place and at the right time. Such a tool can relatively easily come into the hands of un-authorized persons. Codes do have the disadvantage that they can be stolen and need to be remembered at any time by the authorized persons.

In the identification system as disclosed in EP-A-300167 the reliability is restricted due to the imaging method thereof.

It is an object of the invention to mitigate these drawbacks and to this end a fraud-proof identification system as listed in the preamble is characterized in that the imaging means comprise a point to point position dependent automatic focusing system for scanning selected lines of a skin line profile to be identified.

In a system according to the invention the use of memorized codes is avoided and thus stealing and forgetting is not a further problem whilst reconstruction of the finger print line profile from the code is impossible. The fact that the imaging system for recording skin line profiles works with an automatic position dependent point-to-point focusing system, no problem due to for example different finger positioning or finger pressure on an imaging surface occurs. Characteristics from a skin-profile or a complete skin line representation are compared with characteristics stored in any memory consisting also of selected characteristics or a full skin line profile.

In a method for finger print analysis as disclosed in WO 8903099 the reliability is increased in that a finger print to be analyzed is divided into an array of portions each of which is separately analyzed and compared with successive further portions for maximum correlation with the first one. This method is very, time consuming and thus expensive.

Position dependent focusing in reading skin line profiles can be realized by adjusting the optical axis of a detection system preferably by an electro-mechanical system. With such a system it is possible to track any skin line profile to determine its geometrical characteristics. The measured characteristics are compared with finger line characteristics stored in a memory. The distance between skin lines can now be measured very accurately as a function of the distance measured along a selected line. This measurement technique yields a continuous function having a single derivative in every point. The skin line representation becomes independent of orientation and of the pressure of a skin part to be examined against the imaging object surface. Since such a line representation is unique for each skin line pattern a unique code can be extracted from the data and compared with a code stored in the memory.

A kind of automatic focusing in imaging for finger print sensing is disclosed in U.S. Pat. No. 4,428,670 which is incorporated by reference herein. It is clear from the description there that the total image field is focused automatically such that an image of the whole skin profile to be recorded is simultaneously optimally focused in an image plane. A totally different kind of automatic focusing is used in a system according to the invention in that the object surface is pixel-wise focused during reading the skin profile. In order to distinguish the invention clearly over this prior art method use is made of the phrase point to point focusing. The extent of an image point can be adapted to the imaging desired for skin line identification.

SUMMARY OF THE INVENTION

In a preferred embodiment the system for selecting characteristic geometrical parts from the skin line profile is provided with a line tracking system for scanning preselected lines out of a total of skin line profiles. From these measurements a unique code can be extracted. The use of such characteristics and of a tracking mechanism in the imaging system substantially reduces the number of information bits to be stored and enables fast measurements. The choice of the number of characteristics is strongly dependent on the measuring reliability and can be adapted to any required reliability. Use can also be made of information within the skin line profile to direct the tracking system such that an interactive mode of image reading can be realized.

The line tracking system can in particular be provided with an optical stylus servo mechanism for example as used in commercial CD players in which an error signal for the servo mechanism can be used as measurement signal. An effective recording of the geometrical characteristics of a skin profile can be obtained with the help of an optical stylus scanning only a reduced area of the skin profile image or even a single line. Such scanning systems, particularly for CD players, are described in U.S. Pat. No. 3,876,842 and U.S. Pat. No. 3,909,608 which are incorporated by reference herein. If necessary the amplitude of the scanning can be enlarged for example with the aid of an optical magnification system such as a microscope objective lens in order to encompass neighbouring lines of a skin line profile to be identified. An inter finger line distance can be measured as a function of the position along say finger line for all inter finger line distance with respect to the preselected line. If the inter finger line distance relative to a single pre-selected line is sufficient for reliable identification, the selected line may be represented by a straight line to simplify the code extraction procedure. It will be clear that the number of distances measured and the area of the skin profile registered is relevant for the reliability and measuring time.

In such systems the tracking system applies an error signal in that the optical axis of a light spot and a detector follows a sinusoidal path guided by the optically detected intersections, thus crossings with finger print lines. The amplitude and frequency of the error signal can be chosen in such a way that the intersections with the neighbouring lines are detected. In this way a very accurate measurement of the inter finger line distances as a function of the position along the line can be measured. In contrast to conventional CCD based systems, individual image pixel intensity is not relevant because the representation system can be arranged to form continuously running lines from a skin line profile and if appropriate a straight line. The inter line distance to a neighboring line is subsequently measured as a function of the distance travelled along the selected line. The measurement is preferably done twice so that inter line distances of two neighbouring lines next to the selected line are determined. Also distances to lines further away from the selected line can be measured and used to determine characteristics to be compared. Due to the fact that mutual distances are used to extract characteristics for comparison the possibility to fraud with line profile patterns copied earlier and recorded on a flexible foil or the like is strongly reduced.

In a preferred embodiment the skin line pattern is obtained by pressing the finger against an elastomer foil such as described in U.S. Pat. No. 4,428,670 or EP 45 915 which are incorporated by reference herein. Preferably the foil is covered with a reflective coating. The reflecting elastomer layer copies the skin line pattern being represented by a relief giving concave and convex regions. These ridges act as concave and convex mirrors in the optical system amplifying the relief such that an optical focusing system such as a CD stylus generates an amplified electrical focusing signal. This signal can be used to determine the valleys and ridges of the skin profile. Now a total finger line profile can be realized from as well the ridges as the valleys. The electrical focusing signal used for this registration now can be used for identification. The reflecting covering also avoids laser light to escape from the system. A plane surface of a field lens or a side wall of a prism of the optical system acts as substrate for the foil. The foil follows ribs of the skin profile and creates a reflecting surface readable in an optical system.

In a further embodiment the line tracking system is controlled by a signal derived from a priori stored information. Thus an interactive mode of operation can be realized enabling a minor time concerning improvement of the reliability of the system.

A method according to the invention can be realized for example in that a person to be authorized gets a blank information carrier for example such as described in FR 2603406 which is incorporated by reference herein. Preferably, a thumb-top profile of the person to be authorized is transferred into a unique code with an optical thumb-top reader and is printed on the blank card and recorded on a flexible foil or the like. This action is executed under supervision. The authorized person from then on uses his personal card of which the stored information will be compared with on-line recorded thumb-top profile information. If both images or codes coincide the desired action is released.

In a further embodiment characteristics are formed by mutual line distances measured in running points along a selected line of a skin line profile. Here the amount of data points determines the degree of security of the system and also increase the costs of the system as well as the measuring time. In particular the thumb-top profile is chosen because this profile consists of nearly parallel lines and is thus easily to be processed. In addition the use of the thumb-top avoids any mental association with finger print taking procedure in a police station.

In an identification system with an imaging system having an object surface for imaging the profile use can be made of means to discriminate between direct and non-direct contact of a skin line profile. Use can be made for example of an electrical conductive layer preferably fixed on the rear side of an elastomer layer as mentioned. With the help of such a conductive layer preferably having the shape of an electrical conductive reflecting covering the well known tangents delta method can be used to discriminate between real skin pressure as an artificial print earlier registered on a rubber foil or the like. The reliability of this method can be improved by dividing the conductive layer in a number of sub-layers such as for example four quadrants covering the image field area.

The invention is applicable within security systems as described in the already mentioned document FR 2603406 for example money transfer systems in any form. The need for a forgettable pin-code is avoided in that this information is extracted from the skin profile. This skin profile information can be carried by the relevant person or can be stored in the apparatus to be used for admittance. Money transfer systems encompass all kinds of systems to be used in exchange of valuables even if not directly by a human hand. In order to increase the necessity level use can be made of information in a personal card as well as information stored in an apparatus protecting the device.

An embodiment of means to be used in a fraud-proof identification system according to the invention consists of a card provided with relevant characteristics and a skin line profile of an authorized person. Such characteristics can be formed by an image of a skin profile or by a digital code characterizing such a skin profile. Registration thereof in a system according to the invention can be realized optically, electronically or with any further method. Such a card can be provided with a skin profile whilst coincidence with a real skin profile of the owner of the card gives a signal enabling said person to execute a desired action.

Some preferred embodiments in accordance with the invention will be described in detail hereafter with reference to the drawing.

DETAILED DESCRIPTION OF THE PREFERRED EMBODIMENTS

Figure 1:
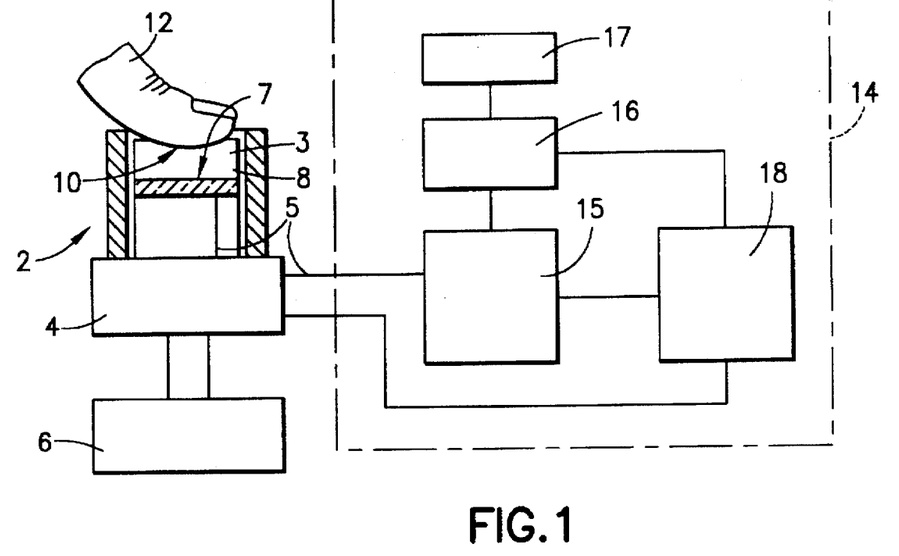
FIG. 1 a schematical representation of an identification system according to the invention.

A fraud-proof system as given in FIG. 1 shows a knob 2 for activating a lock 4 of a secured arrangement 6. The knob 2 is provided with a skin profile imaging system 8 comprising a CCD camera 7 or a line tracking device mounted reverse to a skin profile object surface 10. For imaging a skin profile particularly of a thumb-top the object surface 10 is ergonomically designed for a thumb-top 12 which preferably also need to be positioned there fore activating the lock 4. Signal leads 5 of the imaging system are connected to an electronic processing unit 14 of the fraud-proof system. Such a processing arrangement encloses a signal processing unit 15, a memory 16 to which potentially a hard copy unit 17 is coupled. Also skin profiles of non-authorized persons can be registered facilitating tracing thereof. The processing unit 14 further comprises a comparison device 18 in which an on-line registered skin profile can be compared with skin profile information previously registered in the memory. Although shown as separate blocks, the electronic processing arrangement 14 can be very small when build up with micro electronic elements.

Figure 2:
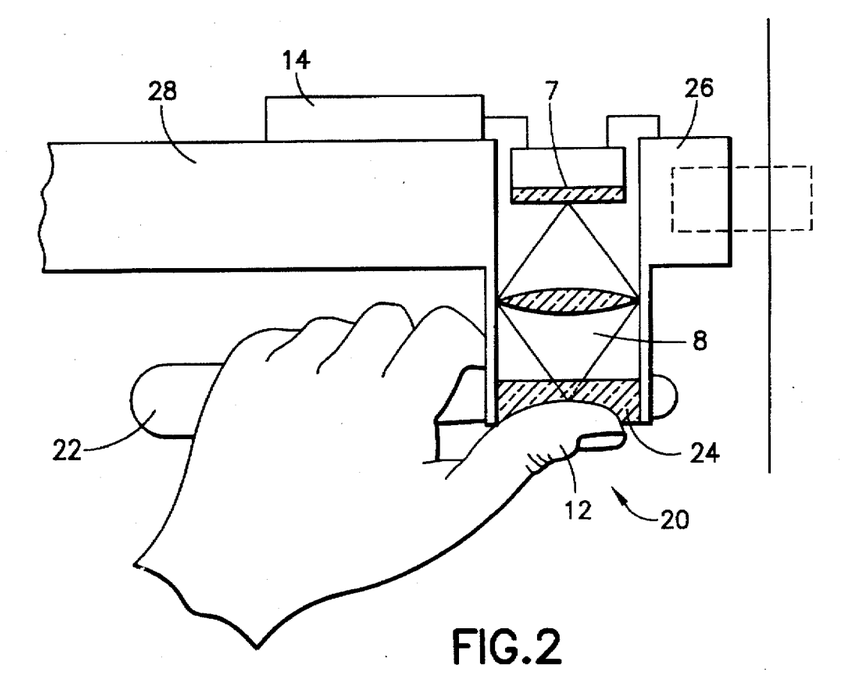
FIG. 2 a door-rock system provided with such a system.

FIG. 2 shows as an example a door-lock system 20 with a latch 22 having the shape of a normal door latch. The lock system 20 is provided with a knob 24 which must be pushed-in for opening a door 28. The knob preferably is shaped in an ergonomical thumb-top location activating the arrangement. The knob 24 is provided with a skin profile imaging system according to the invention. Care should be taken that activating the lock without thumb-top pressing can also not be executed by authorized persons. Authorized persons thus should know that this must be done and consequently it is not a necessity for the thumb-top location to be ergonomically located. Further parts of the system like a processing unit 14 preferably are located near to the door lock 26 of the door 28.

A security system also can enclose a lot of secured arrangements being connected to a common electronic processor for example for safeguarding a complex building or the like. The processing unit comprises a memory in which a group of authorized skin profiles are stacked. If an on-line read-in profile belongs to the group, the action looked for can be executed. If the read-in profile does not belong to the stacked groups, the read-in profile may nevertheless be registered in order to facilitate tracing of the relevant person. To this end the system can directly be coupled to a guard station either.

Figure 3A:
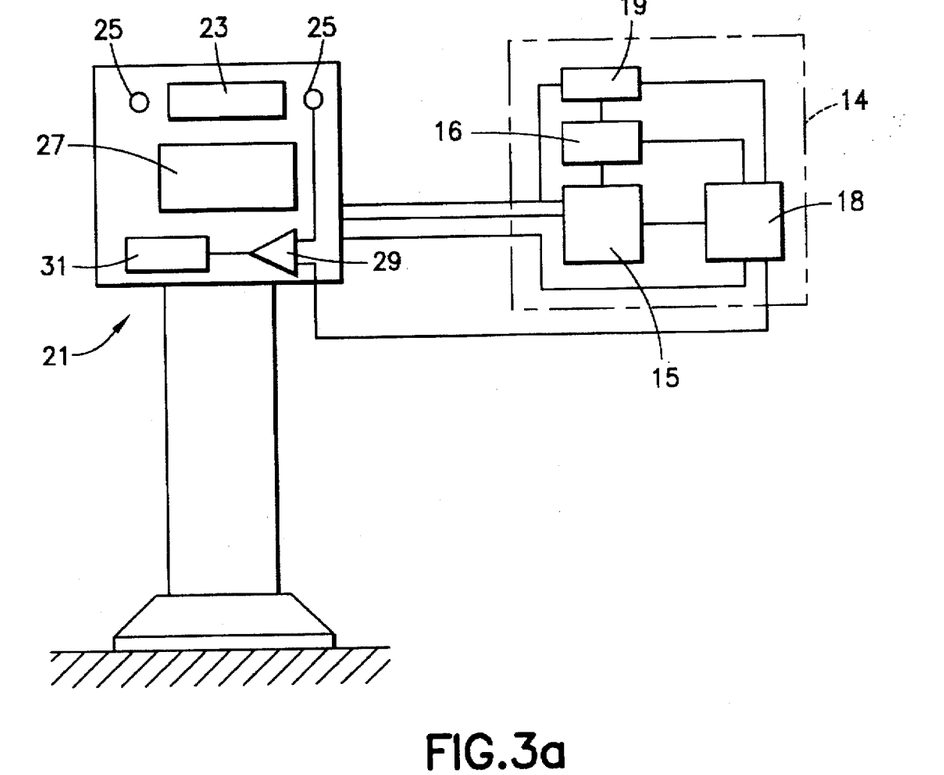
FIGS. 3a–3b are a schematical representations of an automatic money supply system provided with such a system and of an information card to be used therein.

FIG. 3a shows an automatic money supply arrangement according to the invention provided with an electronic processing unit 14 with a signal processing unit 15, a memory 16, a comparison unit 18 and a line follower 19 preferably provided with a servo-mechanism such as described in U.S. Pat. No. 4,491,940 which is incorporated by reference herein. A correction signal of the servo-mechanism now can be joined to the comparison unit 18. Information for the line follower can be taken from the signal processing unit 15 or alternatively directly from an imaging surface of a skin line profile imaging system. The money supply arrangement further shows a housing 21 for a card pick-up unit 23, a skin line profile pick-up system indicated here as knobs 25 for thumb-top profile registration. The knob can be arranged such that the card pick-up device can exclusively be used after pushing in the knobs and the knobs can be provided with means enabling discrimination between direct and non-direct contact between the object surface and a skin profile preferably these means are based on the well known tangents delta measuring. The housing 21 further comprises a keyboard 27 for example to type in information, such as the amount of money asked for etcetera, a discriminator 29 enabling to act with a money supply upon approvement of the registered skin profile and the skin profile taken in on-line.

Figure 3B:
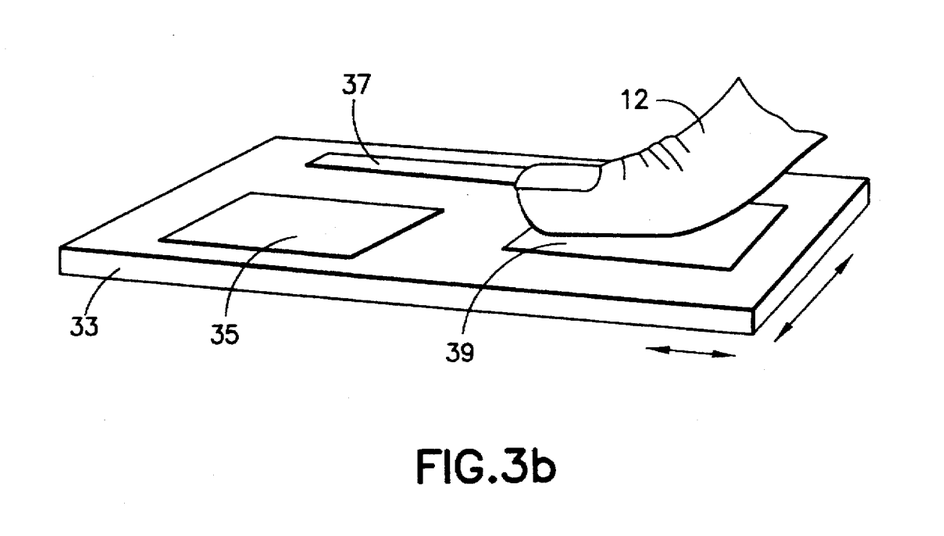

FIG. 3b shows a card 33 to be used in a fraud-proof system according to the invention. Such a card may comprise an area 35 for a passport photograph or any other identifying image information, an area 37 for alpha-numerical information such as a running number etcetera and an area 39 for a skin profile particularly a thumb-top profile directly imaged from a thumb-top and registered in a coded shape, preferably. Such a card can be arranged to be used in a fraud-proof system for example in the money supply system as described. It is alternatively also possible to use a real skin profile registered on the card to be read out by an arrangement according to the invention. To this end the arrangement is provided with a card support enabling translation of the card in the thumb-top profile imaging system. The arrangement generates a signal upon coincidence in position and shape of the profile. The signal indicates that the action looked for is allowed and possible. Such a signal can be a light signal generated in a phosphor layer fixed to the card and having preferably a specific spectrum to be discriminated by the system. Alternatively an electric signal can be generated.

Figure 4:
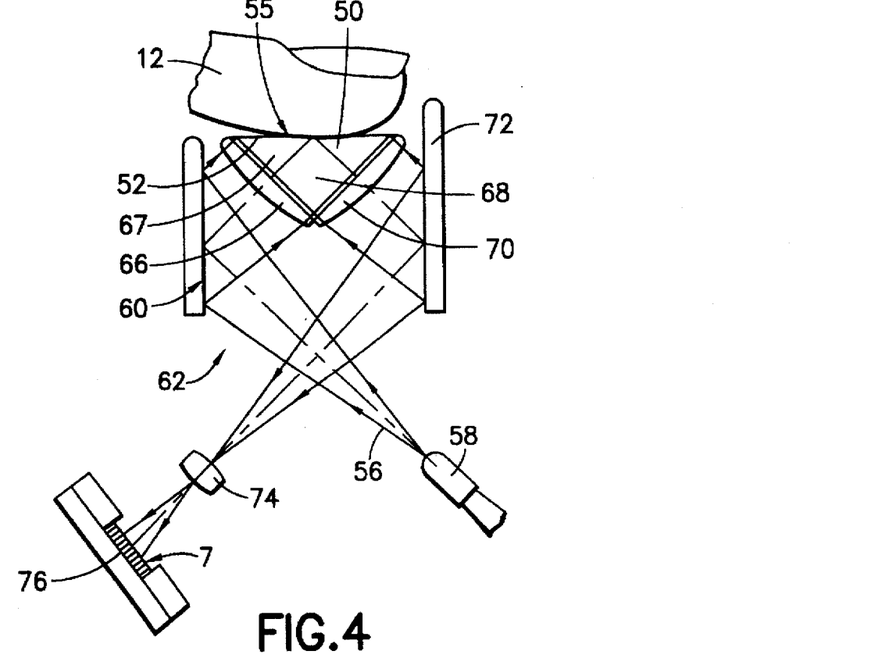
FIGS. 4 and 5 are optical imaging systems to be used in such systems.
Figure 5:
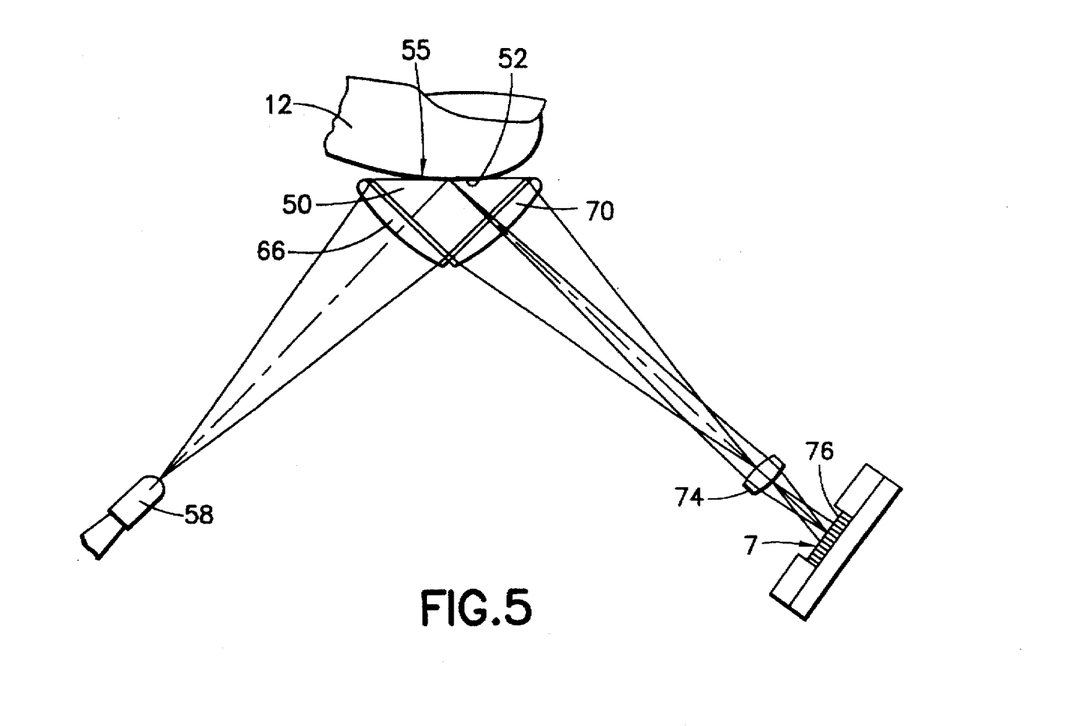

FIG. 4 shows schematically an optical imaging system arranged to record an image of a skin profile, preferably with a reduced scale. A base surface 52 of a prism 50 functions as object surface for a skin profile to be imaged, said surface can be covered with an elastic (isomer) layer or with a sandwich of an elastic layer and an electrical conductive layer 55' (FIG. 5). A light beam 56 from a light source 58 for example a LED or a laser is reflected on a mirror 60 being arranged on an inner wall of a hollow cylinder 62 preferably provided in a secured system. The light beam is parallized by a field lens 66 and impinges as a parallel beam 67 upon the inner side of the base surface 52 of the prism 50. An image supporting light beam 68 being reflected at the object surface forms with the help of a second field lens 70, a second mirror 72 and a lens 74 provides an image on the image surface 7 here for example of a CCD matrix 76. The field lenses are preferably optically bonded to the prism and are to this end preferably plan convex shaped or may alternatively form part of the prism. The function of the field lenses can be fulfilled with mirrors, surfaces of which should be parabolically adapted to the optical imaging system. The lens strength determined by the distance to the light source or to an image of the light source in the imaging lens can be optimized in order to obtain an appropriate geometrical structure.

FIG. 5 shows an optical imaging system discriminating on the base of whether or not total reflection occurs from the object surface for the skin profile to be imaged. Such an action easily enables to work digitized in the imaging system already, substantially facilitating further signal processing. The system is provided with a prism 50 and field lenses 66 and 70. In order to ensure a well defined discrimination between total reflection and non-total reflection, the light beam illuminating line prism should have a high degree of parallelism stipulating relatively high quality standards to the optical elements. A mirror system is less appropriate here but can nevertheless be used. For the imaging on an imaging surface for a sensor 76 there is incorporated an imaging lens 74. As an example a 45° prism 50 is used being compared of material having an index of refraction of about 1.5 resulting in a Brewster angle of about 42°. This stipulates a top half beam opening for the illuminating light beam of about 3°. A field lens with a focusing distance of about 45 mm then gives at the image lens 74 a beam diameter of about 4.5 mm easily fulfilling the tasks to fill the whole opening thereof. If a thumb-top profile 55 of a thumb 12 is pushed on the base surface 52 of the prism 50, skin ribs of the thumb-top destroy total reflection of light infringing on the inner surface 52. At the location of the ribs the light is reflected in a substantial lower degree and thus dark line profiles in a light image field appear. This pattern is imaged with the aid of an imaging lens 74 on the image surface 7, potentially an entrance surface of a CCD sensor 76 having a sensitive surface geometry of for example 6.0×4.5 mm² and being composed of detecting elements of about 15×10 µm². By adjusting a small angle between the cardinal plane of lens 74 and the image surface 7 an in focus image can be realized over the whole surface. The image surface 7 preferably may have a cross section adapted to the area to be scanned by a light pen skin profile registration according to the invention.

Figure 6A:
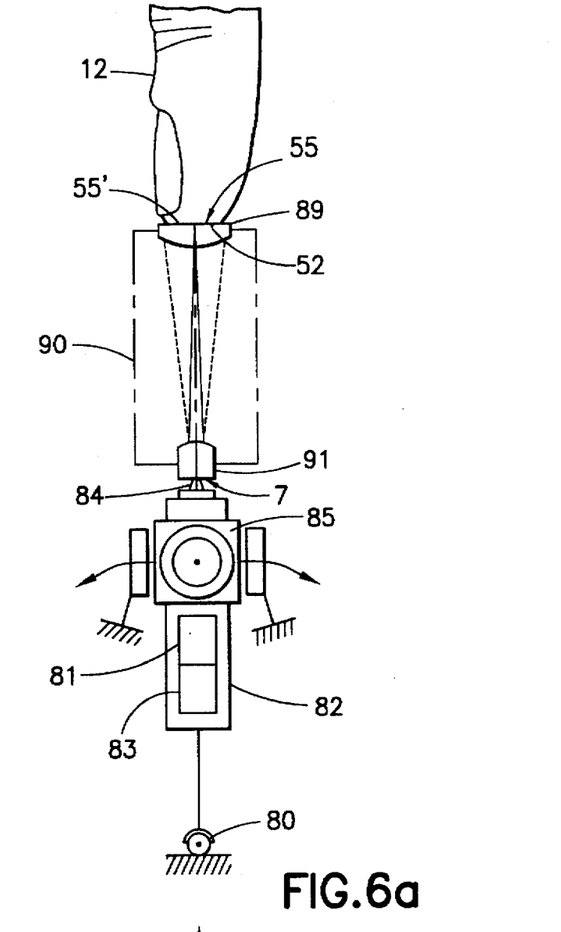
FIGS. 6A–6B are examples of a line tracking system to be used.
Figure 6B:
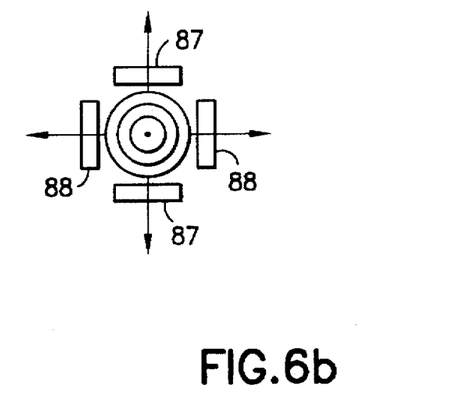
Figure 7A:
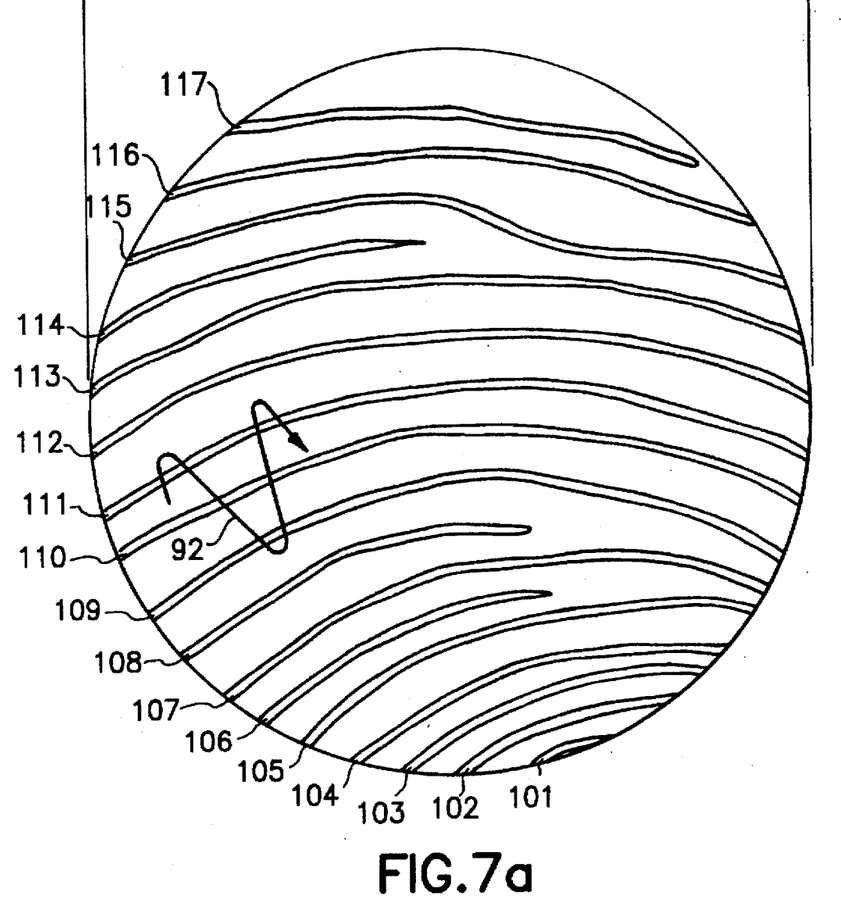
FIGS. 7A–7B are examples of a thumb-top profile with mutual line distances determinating peaks.
Figure 7B:
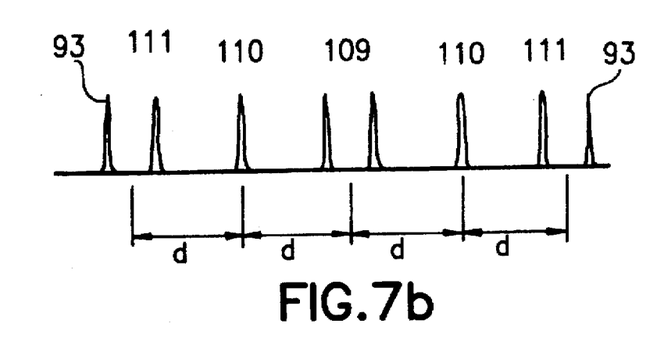

An example of such a light pen skin profile registration system is given in FIG. 6. The system shows a light pen device 82 supported by a ball bearing 80. Thus a light spot 84 can be scanned over an image of a skin profile in the image plane 7 with the help of a beam bending system 85 which may encompass an automatic focusing system 81, a servo mechanism 83 and comprise a first pair of beam bending elements 87 and a second pair of beam bending elements 88. For the imaging of a thumb-top profile 55 of a thumb 12 the system comprises a field lens 89, a surface 52 of which forms an entrance window thus an object plane for an optical demagnification system 90 with an objective lens 91. The optical demagnification system 90 images the thumb-top profile and reduces the measuring of the profile with about a factor 20. Thus an object plane having a diameter of for example 12 mm as given in FIG. 7 is reduced to an image to be scanned of about 0.6 mm. With beam bending elements 87 being preferably electromagnetic coils the light spot is scanned preferably in the direction of skin ribs indicated 101 through 117 in FIG. 7a. The beam bending elements 88 also are electromagnetic coils and ensure skin line following along said skin ribs. Thus a light spot 84 wobbles for example with a frequency of 1 kHz across the lines of the profile as indicated with a line 92 in FIG. 7. Line crossings generate measuring peaks 83 and thus distances $d_i$ to a central line 100 as a reference line can be determined. The choice of the number of lines to which distances are measured define the degree of security of the measuring.

Figure 8:
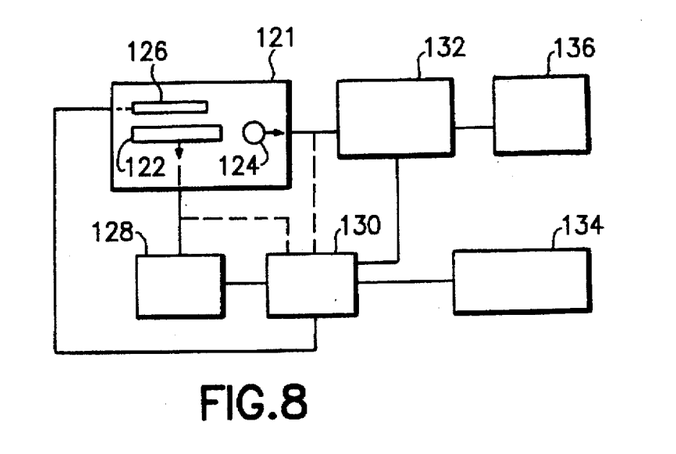
FIG. 8 is a general block scheme of such a system.
Figure 9A:
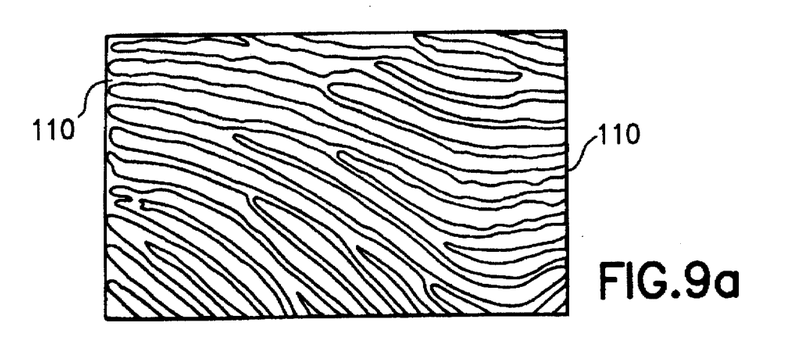
FIGS. 9a–9d are progressive steps in image enhancement of a skin profile to be used in such a system.
Figure 9B:
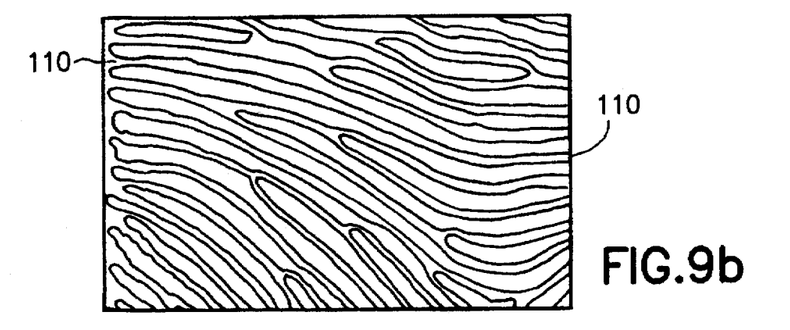
Figure 9C:
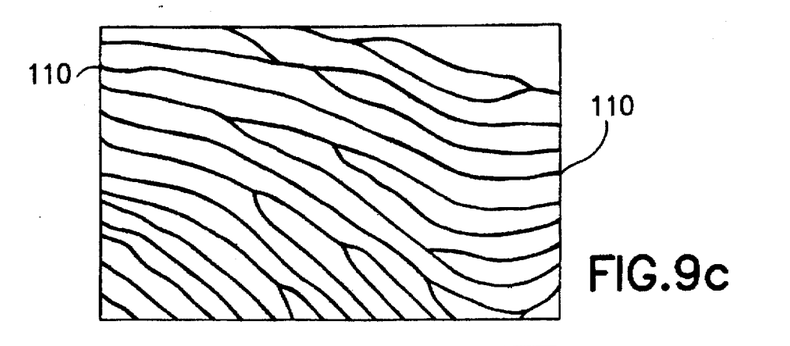
Figure 9D:
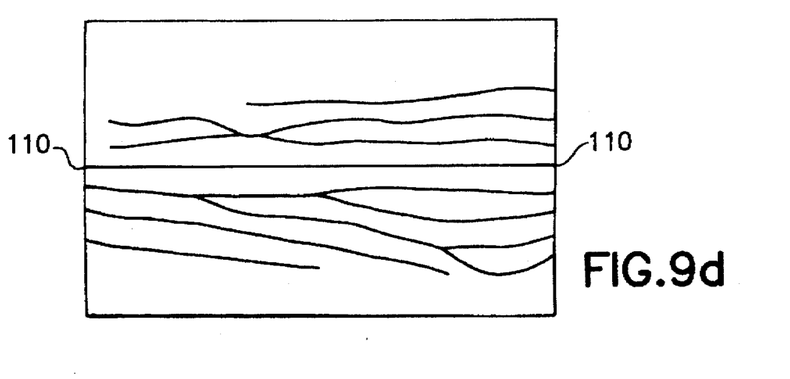

With respect to a block scheme as given in FIG. 8 the working of a preferred embodiment according to the invention will now be described. The block scheme shows an imaging system 121 to be compared with element 21 in FIG. 3a and having an input opening 122 for example for an identification card, an opening 124 for location of a finger- or thumb-top for skin profile reading and a display 126. The thumb-top location may be performed such that only after a right thumb-top positioning the entrance for the card becomes opened. Information read from the card activates a memory, 128 from which stocked information is furnished to the comparison unit 130 for identification. If the card functions as information support of skin profile information this information can be given directly to the comparison device 130. The registered thumb-top information is supplied to a conversion device 132 which may include a tg δ discriminating circuitry or if the profile image as such is used, this will be directly supplied to the comparison unit. If the comparison is positive the secured system 134 becomes accessible. If the comparison is negative a second proof will potentially be asked for registration of profiles for registration of arrival and departure etcetera.

FIG. 9 shows three successive stages in image enhancement to be processed in a system according to the invention. FIG. 9a shows an image as registered with a line tracking system from a thumb-top profile. In FIG. 9 the profile lines or ribs are transformed into continuous lines and FIG. 9c mathematical white lines deduced from the lines in FIG. 9b indicating central lines from those lines. FIG. 9d shows schematically such a line profile image in which a selected line, line number 110 in FIG. 7, FIGS. 9a, 9b and 9c is converted into a straight line from which distances to neighbouring lines are determined.

Figure 10:
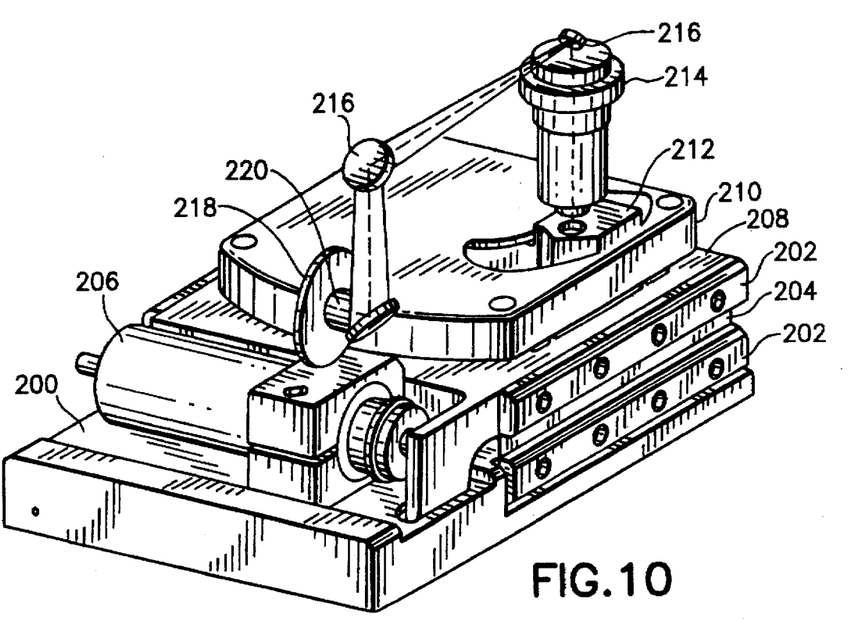
FIG. 10 is an example of an embodiment of such a system.

An apparatus as given in FIG. 10 shows a base plate 200 on which two clamping leaves 202 are mounted enclosing a leave spring system 204 to enable lateral movement with the aid of a linear translation drive 206 such as an inchworm known in the literature. Upon a mounting plate 208 a scanning system 210 is mounted whereof a CD light pen system for radial movement with a microscope objective lens 214, a mirror system comprising three mirrors 216 to fold the light beam path for the light beam to be used for the recording of a finger print, an object holder 218 to engage the finger top having an object surface corresponding with the surface 55 in FIG. 6. The object plane is for example a flat plane of a plane convex field lens acting as object window for the imaging system. The object surface may be provided with a resilient foil to improve imaging as described. This arrangement results in a rather compact apparatus, most parts of which are known elements and thus can be relatively cheap, but nevertheless be very reliable.

I claim:
1. A fraud-proof identification system, comprising:
   a) means for sensing a skin line profile, said means for sensing including a servo-line tracking system to track along a plurality of sensing points at least one selected skin line of said skin line profile;
   b) means for deriving distinctive geometrical characteristics from said skin line profile to be compared with characteristics stored in a memory; and
   c) means to generate at each of said plurality of sensing points a refocussed measuring of said distinctive geometrical characteristics of said skin line profile along said skin line.
2. A fraud-proof identification system according to claim 1, wherein:
   said servo-line tracking system includes means for generating an enlarged error signal in order to encompass at least two neighboring skin lines of a skin line profile for determining interline spacings as a function of a distance along one of said two neighboring skin lines.
3. A fraud-proof identification system according to claim 2, further comprising:
   d) an elastic layer covered with a reflective layer to be pressed down upon by the skin line profile to be identified in order to generate a topographical relief of said skin line profile to be tracked by the servo-line tracking system.
4. A fraud-proof identification system according to claim 3, wherein:
   said means for deriving distinctive geometrical characteristics derives said geometrical characteristics from spacing between skin lines of a thumb-top profile.
5. A fraud-proof identification system according to claim 3, wherein:
   said fraud-proof identification system has an interactive mode of operation wherein said servo-line tracking system is controlled by a signal derived from stored information.
6. A fraud-proof identification system according to claim 5, wherein:
   said means for deriving distinctive geometrical characteristics derives said geometrical characteristics from spacing between skin lines of a thumb-top profile.

7. A fraud-proof identification system according to claim 2, wherein:

said fraud-proof identification system has an interactive mode of operation wherein said servo-line tracking system is controlled by a signal derived from stored information.

8. A fraud-proof identification system according to claim 7, wherein:

said means for deriving distinctive geometrical characteristics derives said geometrical characteristics from spacing between skin lines of a thumb-top profile.

9. A fraud-proof identification system according to claim 2, wherein:

said means for deriving distinctive geometrical characteristics derives said geometrical characteristics from spacing between skin lines of a thumb-top profile.

10. A fraud-proof identification system according to claim 1, further comprising:

d) an elastic layer covered with a reflective layer to be pressed down upon by the skin line profile to be identified in order to generate a topographical relief of said skin line profile to be tracked by the servo-line tracking system.

11. A fraud-proof identification system according to claim 10, wherein:

said fraud-proof identification system has an interactive mode of operation wherein said servo-line tracking system is controlled by a signal derived from stored information.

12. A fraud-proof identification system according to claim 11, wherein:

said means for deriving distinctive geometrical characteristics derives said geometrical characteristics from spacing between skin lines of a thumb-top profile.

13. A fraud-proof identification system according to claim 10, wherein:

said means for deriving distinctive geometrical characteristics derives said geometrical characteristics from spacing between skin lines of a thumb-top profile.

14. A fraud-proof identification system according to claim 1, wherein:

said fraud-proof identification system has an interactive mode of operation wherein said servo-line tracking system is controlled by a signal derived from stored information.

15. A fraud-proof-identification system according to claim 14, wherein:

said means for deriving distinctive geometrical characteristics derives said geometrical characteristics from spacing between skin lines of a thumb-top profile.

16. A fraud-proof identification system according to claim 1, wherein:

said means for deriving distinctive geometrical characteristics derives said geometrical characteristics from spacing between skin lines of a thumb-top profile.

* * * * *